(12) United States Patent
Yamamoto

(10) Patent No.: US 11,903,108 B2
(45) Date of Patent: Feb. 13, 2024

(54) ILLUMINATION CONTROL DEVICE AND ILLUMINATION SYSTEM

(71) Applicant: Yazaki Corporation, Tokyo (JP)

(72) Inventor: Shohei Yamamoto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/949,409

(22) Filed: Sep. 21, 2022

(65) Prior Publication Data

US 2023/0086717 A1 Mar. 23, 2023

(30) Foreign Application Priority Data

Sep. 22, 2021 (JP) ................................ 2021-154654

(51) Int. Cl.
H05B 45/20 (2020.01)

(52) U.S. Cl.
CPC .................................... H05B 45/20 (2020.01)

(58) Field of Classification Search
CPC .... H05B 45/20; H05B 45/325; H05B 47/105; H05B 47/175; Y02B 20/40
See application file for complete search history.

(56) References Cited

U.S. PATENT DOCUMENTS

| | | | |
|---|---|---|---|
| 2013/0119872 A1* | 5/2013 | Chobot | H05B 45/20 200/18 |
| 2015/0379941 A1* | 12/2015 | Satake | G09G 3/2003 345/82 |
| 2017/0041992 A1 | 2/2017 | Sumi et al. | |
| 2017/0181242 A1* | 6/2017 | Johnson | H05B 45/325 |
| 2017/0290127 A1 | 10/2017 | Shigezane et al. | |
| 2020/0245429 A1 | 7/2020 | Sugimoto | |
| 2022/0118128 A1* | 4/2022 | Qiu | A61L 2/24 |

FOREIGN PATENT DOCUMENTS

| | | |
|---|---|---|
| CN | 111479369 A | 7/2020 |
| JP | 2016-126868 A | 7/2016 |

* cited by examiner

*Primary Examiner* — Raymond R Chai
(74) *Attorney, Agent, or Firm* — Sughrue Mion, PLLC

(57) ABSTRACT

An illumination control device includes a first acquisition unit that acquires color information and brightness information, a first storage unit that stores duty ratios of a red light emitting element, a green light emitting element, and a blue light emitting element for each piece of color information, a second storage unit that stores a reference duty ratio for each piece of brightness information, a second acquisition unit that acquires the duty ratios of the red, green and the blue light emitting elements corresponding to the color information, a third acquisition unit that acquires the reference duty ratio corresponding to the brightness information, a calculation unit that calculates the output duty ratios by multiplying the duty ratios by the reference duty ratio, and an output unit that outputs the pulse signals with the output duty ratios to the red, green and the blue light emitting elements.

7 Claims, 4 Drawing Sheets

FIG. 2

| COLOR NUMBER | 1 | 2 | 3 | 4 | 5 | 6 | ... | 59 | 60 | 61 | 62 | 63 | 64 |
|---|---|---|---|---|---|---|---|---|---|---|---|---|---|
| RED(R) Dr | 67 | * | * | * | * | * | ... | * | * | * | * | * | * |
| GREEN(G) Dg | 100 | * | * | * | * | * | ... | * | * | * | * | * | * |
| BLUE(B) Db | 37 | * | * | * | * | * | ... | * | * | * | * | * | * |

FIG. 3

| STEP NUMBER | 0 | 1 | 2 | 3 | 4 | 5 | ... | 24 | 25 | 26 | 27 | 28 | 29 |
|---|---|---|---|---|---|---|---|---|---|---|---|---|---|
| REFERENCE DUTY RATIO Dref | 0 | 0 | 0 | 0.1 | 0.2 | 0.5 | ... | 56.4 | 63.8 | 71.8 | 80.5 | 89.9 | 100 |

ILLUMINATION CONTROL DEVICE AND ILLUMINATION SYSTEM

CROSS-REFERENCE TO RELATED APPLICATIONS

This application is based on and claims priority under 35 USC 119 from Japanese Patent Application No. 2021-154654 filed on Sep. 22, 2021, the contents of which are incorporated herein by reference.

TECHNICAL FIELD

The present disclosure relates to an illumination control device and an illumination system.

BACKGROUND ART

There has generally been known a technique of adjusting luminance by controlling a duty ratio of a light emitting diode (LED) as disclosed in JP2016-126868A. In addition, an illumination system that adjusts luminance and color by controlling a duty ratio of a full-color LED having red (R), green (G), and blue (B) LEDs has also been proposed. The illumination system includes a master electronic control unit (ECU) as a host control device and an illumination ECU as an illumination control device. The master ECU transmits color numbers and brightness to the illumination ECU. The illumination ECU controls duty ratios of signals output to a red (R) LED, a green (G) LED, and a blue (B) LED so that colors indicated by the received color numbers and the received brightness are obtained.

More specifically, the illumination ECU stores, for each color number, a color table showing duty ratios of R, G, and B LEDs corresponding to the brightness. The illumination ECU reads the color table corresponding to the received color number, reads a duty ratio corresponding to brightness received from the read color table, and outputs a signal with the read duty ratio to the R, G, and B LEDs.

Installation of the color table has the following advantages as compared with the technique of transmitting the duty ratios of the R, G, and B LEDs from the master ECU to the illumination ECU. 1) A frame length of a signal transmitted from the master ECU to the illumination ECU can be shortened, and an output state of the LEDs can be changed at a higher frequency. 2) Resolution of each of the duty ratios can be made finer. 3) The duty ratio can be finely adjusted for each brightness.

However, there is a problem that it is necessary to increase a capacity of a storage unit that stores the color table when the color tables are installed. For example, color tables capable of outputting 64 colors and adjusting brightness in 30 stages require a capacity of 7200 bytes as shown in the following formula (1).

$$3 \text{ (the number of LEDs)} \times 10 \text{ bits (data amount indicating duty ratios)} \times 30 \text{ (stages)} \times 64 \text{ (colors)} = 57600 \text{ bits} = 7200 \text{ bytes} \quad (1)$$

SUMMARY OF INVENTION

The present disclosure has been made in view of the above circumstance, and an object of the present disclosure is to provide an illumination control device and an illumination system capable of reducing a capacity of a storage unit.

In order to implement the above object, an aspect of non-limiting embodiments of the present disclosure relates to provide an illumination control device for controlling output duty ratios of pulse signals output to a red light emitting element, a green light emitting element, and a blue light emitting element, the illumination control device including:

a first acquisition unit configured to acquire color information and brightness information;

a first storage unit that stores duty ratios of the red light emitting element, the green light emitting element, and the blue light emitting element for each piece of color information;

a second storage unit that stores a reference duty ratio for each piece of brightness information;

a second acquisition unit configured to acquire the duty ratios of the red light emitting element, the green light emitting element, and the blue light emitting element corresponding to the color information acquired from the first storage unit;

a third acquisition unit configured to acquire the reference duty ratio corresponding to the brightness information acquired from the second storage unit;

a calculation unit configured to calculate the output duty ratios by multiplying the duty ratios of the red light emitting element, the green light emitting element, and the blue light emitting element acquired by the second acquisition unit by the reference duty ratio acquired by the third acquisition unit; and an output unit configured to output the pulse signals with the output duty ratios calculated by the calculation unit to the red light emitting element, the green light emitting element, and the blue light emitting element.

According to an aspect of the present disclosure, there is also provided an illumination system including:

a host control device configured to transmit color information and brightness information; and an illumination control device configured to control output duty ratios of pulse signals output to a red light emitting element, a green light emitting element, and a blue light emitting element such that the red light emitting element, the green light emitting element, and the blue light emitting element emit light with colors indicated by the color information and brightness indicated by the brightness information transmitted from the host control device, in which the illumination control device includes:

a first acquisition unit configured to receive and acquire the color information and the brightness information transmitted from the host control device;

a first storage unit that stores duty ratios of the red light emitting element, the green light emitting element, and the blue light emitting element for each piece of color information;

a second storage unit that stores a reference duty ratio for each piece of brightness information;

a second acquisition unit configured to acquire the duty ratios of the red light emitting element, the green light emitting element, and the blue light emitting element corresponding to the color information acquired from the first storage unit;

a third acquisition unit configured to acquire the reference duty ratio corresponding to the brightness information acquired from the second storage unit;

a calculation unit configured to calculate the output duty ratios by multiplying the duty ratios of the red light emitting element, the green light emitting element, and the blue light emitting element acquired by the second acquisition unit by the reference duty ratio acquired by the third acquisition unit; and an output unit configured to output the pulse signals with the output duty ratios calculated by the calculation unit to the red light emitting element, the green light emitting element, and the blue light emitting element.

According to the illumination device and the illumination system of the present disclosure, it is possible to provide an illumination control device and an illumination system that can reduce a capacity of a storage unit.

The present disclosure has been briefly described above. Further, details of the present disclosure will be further clarified by reading through a mode for carrying out the invention described below (hereinafter referred to as an "embodiment") with reference to the accompanying drawings.

BRIEF DESCRIPTION OF DRAWINGS

FIG. 2 shows a color table stored in a ROM constituting an illumination ECU shown in FIG. 1.

FIG. 3 shows a fade table stored in the ROM constituting the illumination ECU shown in FIG. 1.

DESCRIPTION OF EMBODIMENTS

Figure 1:
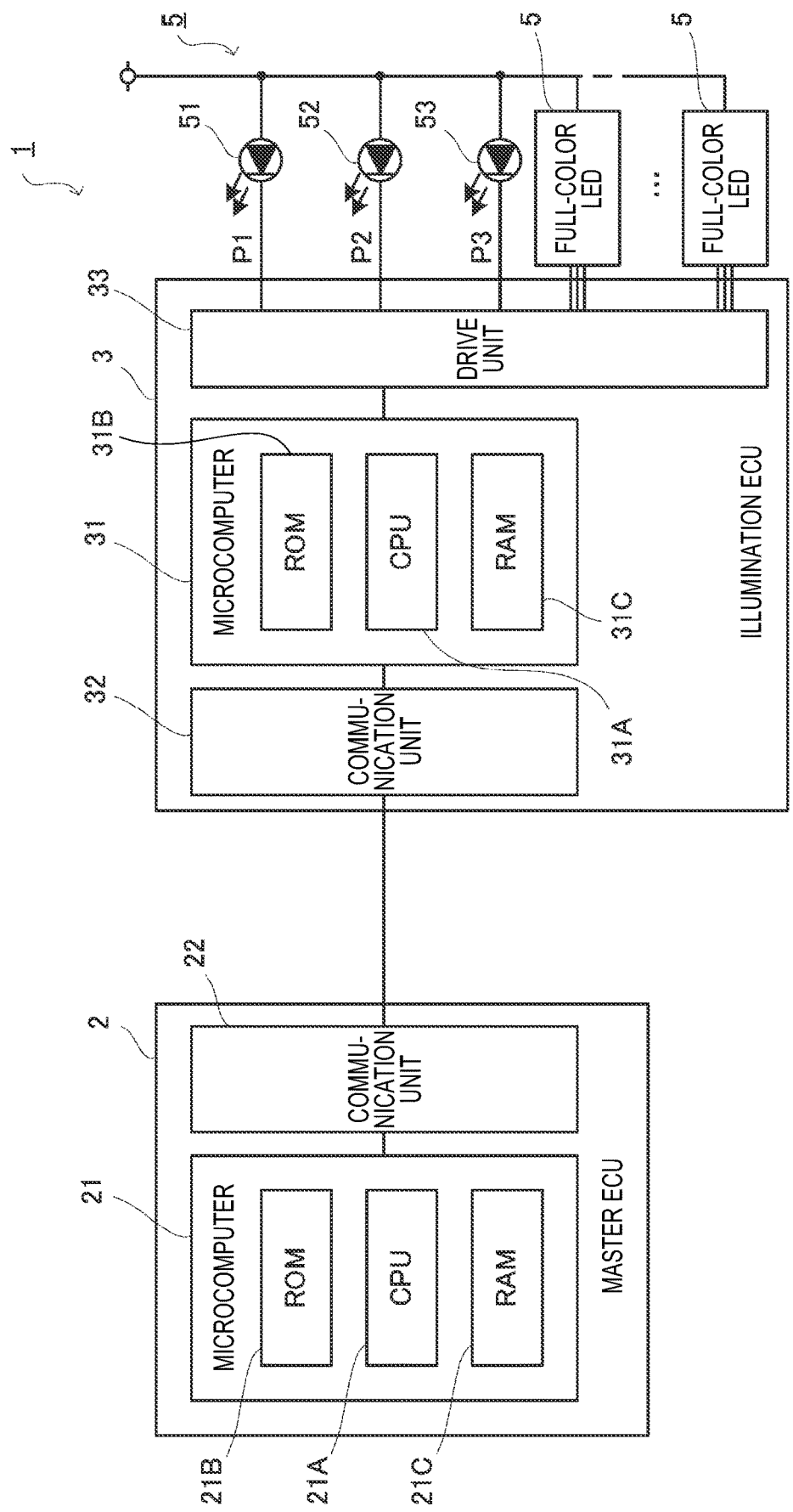
FIG. 1 is a configuration diagram showing an illumination system according to an embodiment of the present disclosure.

A specific embodiment of the present disclosure will be described below with reference to the drawings.

An illumination system 1 of the present embodiment is mounted on a vehicle, for example, and controls full-color LEDs 5. Each of the full-color LEDs 5 includes a red light emitting element (RLED) 51, a green light emitting element (GLED) 52, and a blue light emitting element (BLED) 53, and may adjust luminance and color. The illumination system 1 includes a master ECU 2 as a host control device and an illumination ECU 3 as an illumination control device.

The master ECU 2 performs multiplex communication with the illumination ECU 3. The master ECU 2 includes a microcomputer 21 and a communication unit 22. The microcomputer 21 includes a central processing unit (CPU) 21A that executes various kinds of processing in accordance with a program, a read only memory (ROM) 21B that is a read-only memory storing a processing program and the like executed by the CPU 21A, and a random access memory (RAM) 21C that is a readable and writable memory having a work area and the like used in various processes in the CPU 21A, and governs overall control of the master ECU 2. The communication unit 22 includes a circuit for communicating with the illumination ECU 3.

The master ECU 2 transmits a turn-on instruction of each of the full-color LEDs 5 to the illumination ECU 2 based on state monitoring of various switches or various sensors that detect various states on a vehicle operable by a user (a driver or the like) and information input from a host ECU (not shown). The turn-on instruction includes color numbers (color information), step information (brightness information), and a fade time, which will be described later.

The illumination ECU 3 controls the full-color LEDs 5 in accordance with a control instruction from the master ECU 2. The illumination ECU 3 includes a microcomputer 31, a communication unit 32, and a drive unit 33. The microcomputer 31 includes a CPU 31A that executes various kinds of processing in accordance with a program, a ROM 31B that is a read-only memory storing a processing program and the like executed by the CPU 31A, and a RAM 31C that is a readable and writable memory having a work area and the like used in various processes in the CPU 31A, and governs overall control of the illumination ECU 3.

The communication unit 32 is configured by a circuit for communicating with the master ECU 3. The drive unit 33 is connected to a power supply (not shown), outputs pulse signals P1, P2, and P3 to the RLED 51, the GLED 52, and the BLED 53, respectively, and causes the RLED 51, the GLED 52, and the BLED 53 to emit light with colors and luminance set by output duty ratios DR, DG, and DB of the pulse signals P1, P2, and P3. The drive unit 33 outputs the pulse signals P1, P2, and P3 with the output duty ratios DR, DG, and DB corresponding to drive signals received from the microcomputer 31 to the RLED 51, the GLED 52, and the BLED 53, respectively, and drives the RLED 51, the GLED 52, and the BLED 53.

In the present embodiment, the ROM 31B (a first storage unit and a second storage unit) of the microcomputer 31 stores a color table shown in FIG. 2 and a fade table shown in FIG. 3. The color table shown in FIG. 2 shows duty ratios Dr, Dg, and Db of the RLED 51, the GLED 52, and the BLED 53 for each color number. The color number is a number assigned to a color, and is information indicating the color. In the embodiment, the color numbers are from "1" to "64", and an emission color of each of the full-color LEDs 5 may be adjusted to 64 colors.

In the present embodiment, the duty ratios Dr, Dg, and Db shown in the color table correspond to brightness corresponding to the maximum step number. For example, as shown in FIG. 2, when a pulse signal P1 with a duty ratio Dr=67% is output to the RLED 51, a pulse signal P2 with a duty ratio Dg=100% is output to the GLED 52, and a pulse signal P3 with a duty ratio Db=37% is output to the BLED 53, the full-color LED 5 emits light with the maximum brightness in the colors corresponding to the color number "1".

The fade table shown in FIG. 3 shows a reference duty ratio Dref for each step number. The step number is a number assigned to brightness, and is information indicating the brightness. In the present embodiment, the step numbers are from "0" to "29", and the brightness of the full-color LED 5 may be adjusted in 30 stages.

Figure 4:
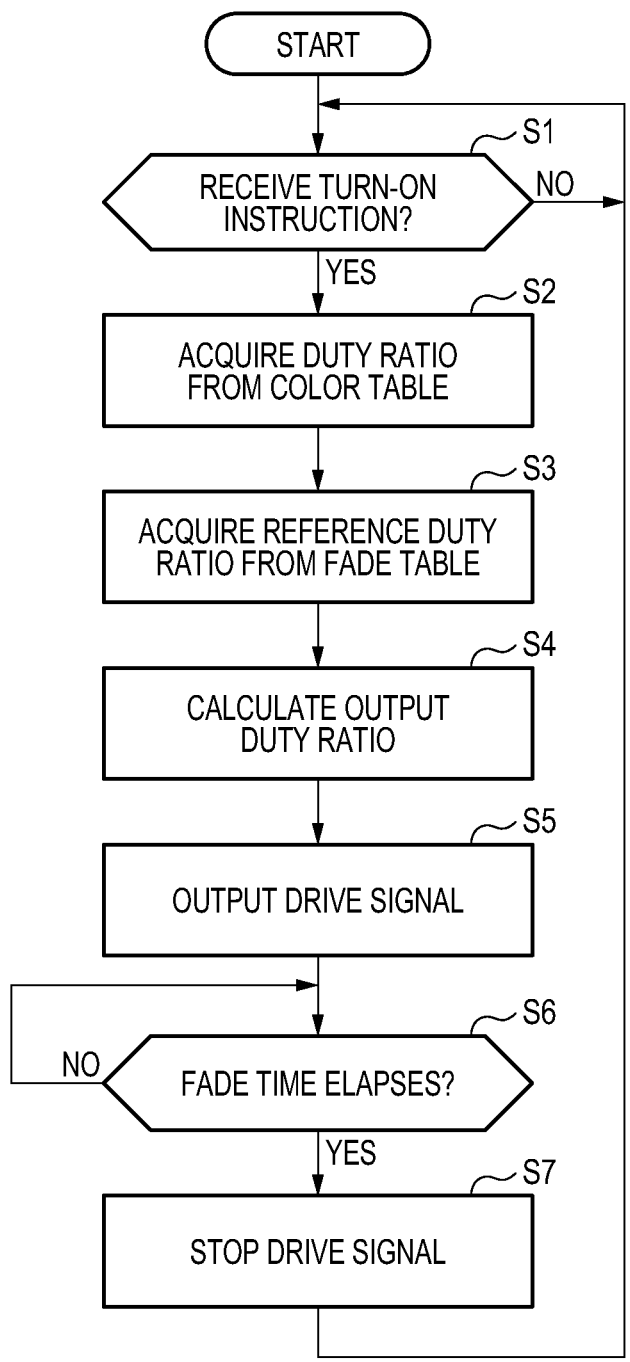
FIG. 4 is a flowchart showing a processing procedure of a CPU constituting the illumination ECU shown in FIG. 1.

Next, an operation of the illumination system 1 having the above configuration will be described with reference to a flowchart of FIG. 4. The master ECU 2 transmits a turn-on instruction and a turn-off instruction to the illumination ECU 3 based on the state monitoring of various switches or various sensors that detect various states on the vehicle operable by the user (the driver or the like) and the information input from the host ECU (not shown). The master ECU 2 transmits the turn-on instruction including the color numbers, the step numbers, and the fade time.

The CPU 31A of the illumination ECU 3 (hereinafter, simply referred to as the "illumination ECU 3") functions as a first acquisition unit and waits for reception of a turn-on instruction (Y in S1), and the flow proceeds to S2. In S2, the illumination ECU 3 functions as a second acquisition unit, and reads and acquires duty ratios Dr, Dg, and Db corresponding to a color number included in the turn-on instruction from the color table shown in FIG. 2. Next, the illumination ECU 3 functions as a third acquisition unit, and reads and acquires a reference duty ratio Dref corresponding to a step number included in the turn-on instruction from the fade table shown in FIG. 3 (S3).

Next, the illumination ECU 3 functions as a calculation unit, and calculates output duty ratios DR, DG, and DB obtained by multiplying the duty ratios Dr, Dg, and Db read in S2 by the reference duty ratio Dref as shown in the following formula (2) (S4).

$$(DR, DG, DB) = (Dr \times Dref, Dg \times Dref, Db \times Dref) \quad (2)$$

Thereafter, the illumination ECU 3 transmits drive signals indicating the output duty ratios DR, DG, and DB to the drive unit 33 (S5). The drive unit 33 as an output unit outputs pulse signals P1, P2, and P3 with the output duty ratios DR, DG, and DB to the RLED 51, the GLED 52, and the BLED 53 based on the drive signals. Thereafter, the illumination ECU 3 waits for the fade time included in the turn-on instruction to elapse (Y in S6) and stops the drive signals (S7), and the flow returns to S1. When output of the drive signals is stopped, the drive unit 33 stops output of the pulse signals P1, P2, and P3 to turn off the RLED 51, the GLED 52, and the BLED 53.

According to the above embodiment, the ROM 31B stores the color table and the fade table, and the illumination ECU 3 reads the duty ratios Dr, Dg, and Db corresponding to the color number from the color table, reads the reference duty ratio Dref corresponding to the step number from the fade table, and calculates the output duty ratios DR, DG, and DB by multiplying the duty ratios Dr, Dg, and Db by the reference duty ratio Dref. Accordingly, it is only necessary to store the color table and the fade table in the ROM 31B, a capacity of the ROM 31B can be reduced.

More specifically, for example, the color table capable of outputting 64 colors shown in FIG. 2 requires a capacity of 240 bytes as shown in the following formula (3).

$$3 \text{ (the number of LEDs)} \times 10 \text{ bits (data amount indicating duty ratios)} \times 64 \text{ (colors)} = 1920 \text{ bits} = 240 \text{ bytes} \quad (3)$$

The fade table capable of adjusting the brightness in 30 stages shown in FIG. 3 requires a capacity of 277.5 bytes as shown in the following formula (4).

$$10 \text{ bits (data amount indicating duty ratios)} \times 30 \text{ (stages)} = 300 \text{ bits} = 277.5 \text{ bytes} \quad (4)$$

That is, in the present embodiment, the color table and the fade table require a capacity of 240 bytes+277.5 bytes=517.5 bytes. On the other hand, a related color table requires a capacity of 7200 bytes as described above. Therefore, the present embodiment can be seen that the capacity can be significantly reduced.

In this way, since the capacity of the ROM 31B is reduced, the inexpensive microcomputer 31 having a small capacity of the ROM 31B can be used, and cost can be reduced. Further, when the microcomputer 31 having the same capacity of the ROM 31B is used, since an occupied capacity is small, more colors can be mounted, and performance can be improved.

It should be noted that the present disclosure is not limited to the above embodiment, and modifications, improvements, and the like can be made as appropriate. In addition, materials, shapes, dimensions, numbers, arrangement positions, and the like of the respective constituent elements in the above embodiment are optionally selected and are not limited as long as the present disclosure can be implemented.

In the above embodiment, the illumination ECU 3 receives and acquires the color number and the step number transmitted from the master ECU 2, but the illumination ECU 3 is not limited thereto. The illumination ECU 3 itself may obtain and acquire the color number and the step number in accordance with the state monitoring output by the switches or the sensors mounted on the vehicle.

Here, features of the illumination control device and the illumination system according to the embodiment of the present disclosure described above will be briefly summarized and listed in [1] to [3] below.

[1] An illumination control device (3) for controlling output duty ratios (DR, DG, DB) of pulse signals (P1, P2, P3) output to a red light emitting element (51), a green light emitting element (52), and a blue light emitting element (53), the illumination control device including:
  a first acquisition unit (31A) configured to acquire color information and brightness information;
  a first storage unit (31B) that stores duty ratios (Dr, Dg, Db) of the red light emitting element (51), the green light emitting element (52), and the blue light emitting element (53) for each piece of color information;
  a second storage unit (31B) that stores a reference duty ratio (Dref) for each piece of brightness information;
  a second acquisition unit (31A) configured to acquire the duty ratios (Dr, Dg, Db) of the red light emitting element (51), the green light emitting element (52), and the blue light emitting element (53) corresponding to the color information acquired from the first storage unit (31B);
  a third acquisition unit (31A) configured to acquire the reference duty ratio (Dref) corresponding to the brightness information acquired from the second storage unit (31B);
  a calculation unit (31A) configured to calculate the output duty ratios (DR, DG, DB) by multiplying the duty ratios (Dr, Dg, Db) of the red light emitting element (51), the green light emitting element (52), and the blue light emitting element (53) acquired by the second acquisition unit (31A) by the reference duty ratio (Dref) acquired by the third acquisition unit (31A); and
  an output unit (33) configured to output the pulse signals (P1, P2, P3) with the output duty ratios (DR, DG, DB) calculated by the calculation unit (31A) to the red light emitting element (51), the green light emitting element (52), and the blue light emitting element (53).

According to the illumination control device having the configuration of [1], it is only necessary to store the duty ratios (Dr, Dg, Db) of the red light emitting element (51), the green light emitting element (52), and the blue light emitting element (53) for each piece of color information in the first storage unit (31B), and store the reference duty ratio (Dref) for each piece of brightness information in the second storage unit (31B), and thus capacities of the first and second storage units (31B) can be reduced.

[2] The illumination control device (3) according to [1], in which
  the first acquisition unit (31A) receives and acquires the color information and the brightness information transmitted from a host control device (2).

According to the illumination control device having the configuration of [2], when the color information and the brightness information are received from the host control device (2), the red light emitting element (51), the green light emitting element (52), and the blue light emitting element (53) can emit light with colors indicated by the received color information and brightness indicated by the brightness information.

[3] An illumination system (1) including:
a host control device (2) configured to transmit color information and brightness information; and
an illumination control device (3) configured to control output duty ratios (DR, DG, DB) of pulse signals (P1, P2, P3) output to a red light emitting element (51), a green light emitting element (52), and a blue light emitting element (53) such that the red light emitting element (51), the green light emitting element (52), and the blue light emitting element emit light (53) with colors indicated by the color information and brightness indicated by the brightness information transmitted from the host control device (2), in which
the illumination control device (3) includes:
  a first acquisition unit (31A) configured to acquire the color information and the brightness information transmitted from the host control device (2);
  a first storage unit (31B) that stores duty ratios (Dr, Dg, Db) of the red light emitting element (51), the green light emitting element (52), and the blue light emitting element (53) for each piece of color information;
  a second storage unit (31B) that stores a reference duty ratio (Dref) for each piece of brightness information;
  a second acquisition unit (31A) configured to acquire the duty ratios (Dr, Dg, Db) of the red light emitting element (51), the green light emitting element (52), and the blue light emitting element (53) corresponding to the color information acquired from the first storage unit (31B);
  a third acquisition unit (31A) configured to acquire the reference duty ratio (Dref) corresponding to the brightness information acquired from the second storage unit (31B);
  a calculation unit (31A) configured to calculate the output duty ratios (DR, DG, DB) by multiplying the duty ratios (Dr, Dg, Db) of the red light emitting element (51), the green light emitting element (52), and the blue light emitting element (53) acquired by the second acquisition unit (31A) by the reference duty ratio (Dref) acquired by the third acquisition unit (33); and
  an output unit configured to output the pulse signals (P1, P2, P3) with the output duty ratios (DR, DG, DB) calculated by the calculation unit (31A) to the red light emitting element (51), the green light emitting element (52), and the blue light emitting element (53).

According to the illumination system having the configuration of [3], it is only necessary to store the duty ratios (Dr, Dg, Db) of the red light emitting element (51), the green light emitting element (52), and the blue light emitting element (53) for each piece of color information in the first storage unit (31B), and store the reference duty ratio (Dref) for each piece of brightness information in the second storage unit (31B), and thus capacities of the first and second storage units (31B) can be reduced.

What is claimed is:

1. An illumination control device for controlling output duty ratios of pulse signals output to a red light emitting element, a green light emitting element, and a blue light emitting element, the illumination control device comprising:
   a first acquisition unit configured to acquire color information and brightness information;
   a first storage unit that stores duty ratios of the red light emitting element, the green light emitting element, and the blue light emitting element for each piece of color information;
   a second storage unit that stores a reference duty ratio for each piece of brightness information;
   a second acquisition unit configured to acquire the duty ratios of the red light emitting element, the green light emitting element, and the blue light emitting element corresponding to the color information acquired from the first storage unit;
   a third acquisition unit configured to acquire the reference duty ratio corresponding to the brightness information acquired from the second storage unit;
   a calculation unit configured to calculate the output duty ratios by multiplying the duty ratios of the red light emitting element, the green light emitting element, and the blue light emitting element acquired by the second acquisition unit by the reference duty ratio acquired by the third acquisition unit; and
   an output unit configured to output the pulse signals with the output duty ratios calculated by the calculation unit to the red light emitting element, the green light emitting element, and the blue light emitting element,
   wherein a first number of bits of the duty ratios stored by the first storage unit is equal to a number of light emitting elements, including the red light emitting element, the green light emitting element, and the blue light emitting element, multiplied by both a data amount indicating the duty ratios and a number of colors represented by the each piece of color information, and
   wherein a second number of bits of the reference duty ratio stored by the second storage unit is equal to both the data amount indicating the duty ratios multiplied by a number of stages represented by the each piece of brightness information.

2. The illumination control device according to claim 1, wherein
   the first acquisition unit receives and acquires the color information and the brightness information transmitted from a host control device.

3. The illumination control device according to claim 1, wherein the first number of bits is greater than the second number of bits.

4. The illumination control device according to claim 3, wherein the first number of bits is more than double the second number of bits.

5. The illumination control device according to claim 1, wherein a total of the first number of bits and the second number of bits is a number of bits that is less than a number of bits in one kilobyte.

6. The illumination control device according to claim 1, wherein the number of light emitting elements is equal to three,
   wherein the data amount indicating the duty ratios is equal to ten bits,
   wherein the number of colors represented by the each piece of color information is equal to sixty four, and
   wherein the number of stages is equal to thirty.

7. An illumination system comprising:
   a host control device configured to transmit color information and brightness information; and
   an illumination control device configured to control output duty ratios of pulse signals output to a red light emitting element, a green light emitting element, and a blue light emitting element such that the red light emitting element, the green light emitting element, and the blue light emitting element emit light with colors indicated by the color information and brightness indicated by the brightness information transmitted from the host control device, wherein
the illumination control device includes:
- a first acquisition unit configured to acquire the color information and the brightness information transmitted from the host control device;
- a first storage unit that stores duty ratios of the red light emitting element, the green light emitting element, and the blue light emitting element for each piece of color information;
- a second storage unit that stores a reference duty ratio for each piece of brightness information;
- a second acquisition unit configured to acquire the duty ratios of the red light emitting element, the green light emitting element, and the blue light emitting element corresponding to the color information acquired from the first storage unit;
- a third acquisition unit configured to acquire the reference duty ratio corresponding to the brightness information acquired from the second storage unit;
- a calculation unit configured to calculate the output duty ratios by multiplying the duty ratios of the red light emitting element, the green light emitting element, and the blue light emitting element acquired by the second acquisition unit by the reference duty ratio acquired by the third acquisition unit; and
- an output unit configured to output the pulse signals with the output duty ratios calculated by the calculation unit to the red light emitting element, the green light emitting element, and the blue light emitting element, wherein a first number of bits of the duty ratios stored by the first storage unit is equal to a number of light emitting elements, including the red light emitting element, the green light emitting element, and the blue light emitting element, multiplied by both a data amount indicating the duty ratios and a number of colors represented by the each piece of color information, wherein a second number of bits of the reference duty ratio stored by the second storage unit is equal to both the data amount indicating the duty ratios multiplied by a number of stages represented by the each piece of brightness information.

\* \* \* \* \*